United States Patent
Lepreux et al.

(10) Patent No.: US 10,683,065 B2
(45) Date of Patent: Jun. 16, 2020

(54) STABILIZATION SYSTEM, IN PARTICULAR FOR A FLOATING SUPPORT, COMPRISING AT LEAST THREE INTERCONNECTED LIQUID RESERVES

(71) Applicant: IFP Energies nouvelles, Rueil-Malmaison (FR)

(72) Inventors: Olivier Lepreux, Lyons (FR); Christophe Coudurier, Lyons (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 0 days.

(21) Appl. No.: 16/081,564

(22) PCT Filed: Feb. 2, 2017

(86) PCT No.: PCT/EP2017/052294
§ 371 (c)(1),
(2) Date: Aug. 31, 2018

(87) PCT Pub. No.: WO2017/148647
PCT Pub. Date: Sep. 8, 2017

(65) Prior Publication Data
US 2019/0061884 A1    Feb. 28, 2019

(30) Foreign Application Priority Data
Mar. 2, 2016    (FR) .................... 16 51746

(51) Int. Cl.
*B63B 35/44*    (2006.01)
*F03D 13/25*    (2016.01)
(Continued)

(52) U.S. Cl.
CPC .............. *B63B 35/44* (2013.01); *F03D 13/25* (2016.05); *F16F 7/1034* (2013.01);
(Continued)

(58) Field of Classification Search
CPC ... B63B 35/44; B63B 2035/446; F03D 13/25; F16F 7/1034; F16F 15/023; F05B 2240/95; F05B 2240/93; Y02E 10/727
See application file for complete search history.

(56) References Cited

U.S. PATENT DOCUMENTS 7,152,544 B2 * 12/2006 Kryska .................. B63B 13/00
114/125
8,471,396 B2 *  6/2013 Roddier .................. F03D 17/00
290/44
(Continued)

FOREIGN PATENT DOCUMENTS

| JP | 2000-018319 A | 1/2000 |
| WO | 2009/043547 A1 | 4/2009 |
| WO | 2015/048147 A1 | 4/2015 |

OTHER PUBLICATIONS

International Search Report for PCT/EP2017/052294, dated Feb. 24, 2017; English translation submitted herewith (6 pgs.).
(Continued)

*Primary Examiner* — Anthony D Wiest
(74) *Attorney, Agent, or Firm* — Fitch, Even, Tabin & Flannery, L.L.P.

(57) ABSTRACT

Stabilization system (1) for a system subjected to external stresses, in particular for a floating support structure, the stabilization system comprising at least three liquid reserves (2) and at least three connecting tubes (3). The liquid reserves are spatially distributed. Furthermore, the connecting tubes provide circulation of the liquid between all the liquid reserves. The invention further relates to a floating support structure comprising such a stabilization system.

19 Claims, 3 Drawing Sheets

(51) Int. Cl.
*F16F 15/023* (2006.01)
*F16F 7/10* (2006.01)

(52) U.S. Cl.
CPC ...... *F16F 15/023* (2013.01); *B63B 2035/446* (2013.01); *F05B 2240/93* (2013.01); *F05B 2240/95* (2013.01); *Y02E 10/727* (2013.01)

(56) References Cited

U.S. PATENT DOCUMENTS

| | | | | |
|---|---|---|---|---|
| 8,692,401 | B2* | 4/2014 | Roddier | B63B 39/03 |
| | | | | 290/44 |
| 9,592,889 | B2* | 3/2017 | Nebrera Garcia | E02D 27/42 |
| 2010/0200348 | A1 | 8/2010 | Reiterer et al. | |
| 2014/0339828 | A1 | 11/2014 | Peiffer et al. | |
| 2016/0369780 | A1* | 12/2016 | Aubault | B63B 35/44 |
| 2017/0314526 | A1* | 11/2017 | Farley | F03B 13/188 |
| 2017/0356416 | A1* | 12/2017 | Fan | F03B 13/264 |

OTHER PUBLICATIONS

C. Coudurier, O. Lepreux and N. Petit, Passive and semi-active control of an offshore floating wind turbine using a tuned liquid column damper, in Proc. of 10th IFAC Conference on Manoeuvring and Control of Marine Craft, MCMC, 2015.

* cited by examiner

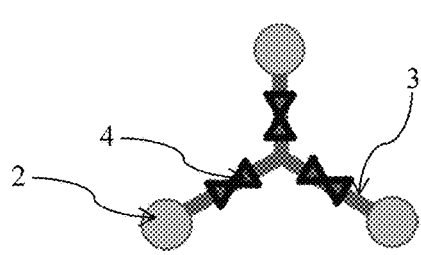
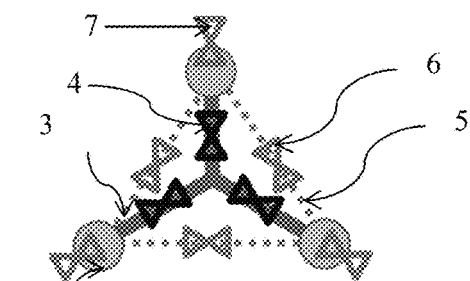
Figure 4a    Figure 4b
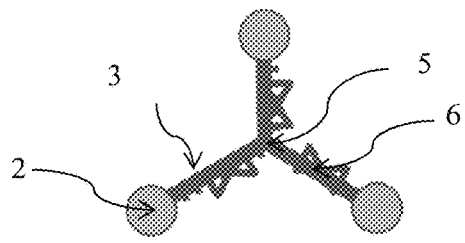
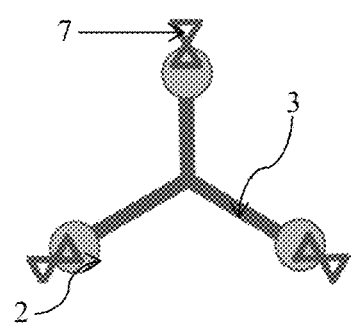
Figure 4c    Figure 4d
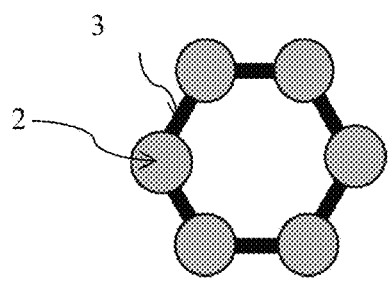
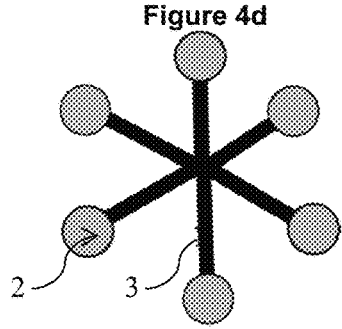
Figure 5a    Figure 5b
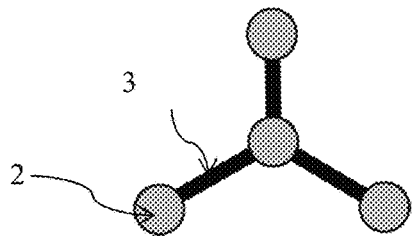
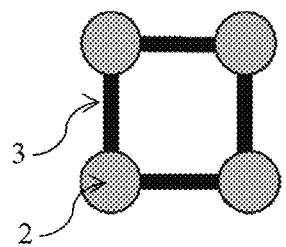
Figure 5c    Figure 5d
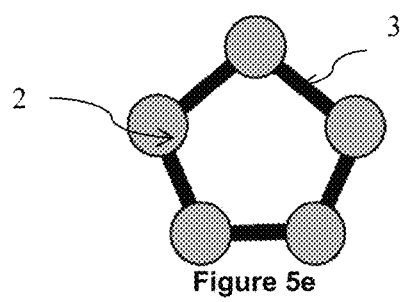
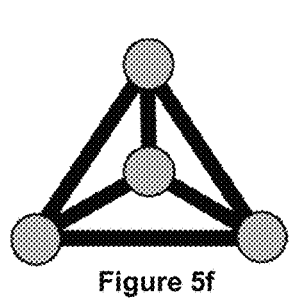
Figure 5e    Figure 5f

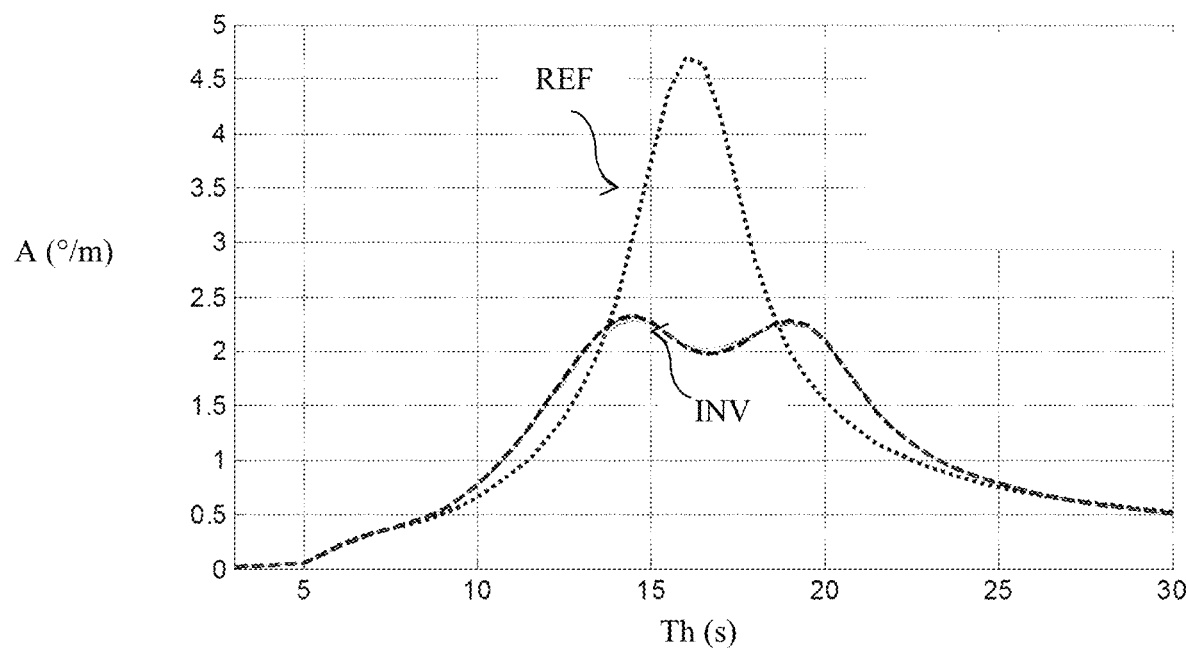
Figure 6
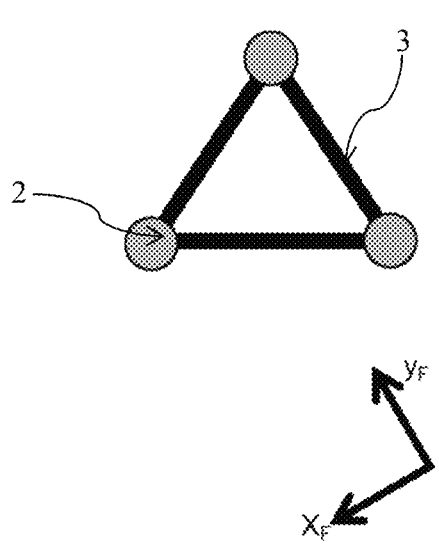 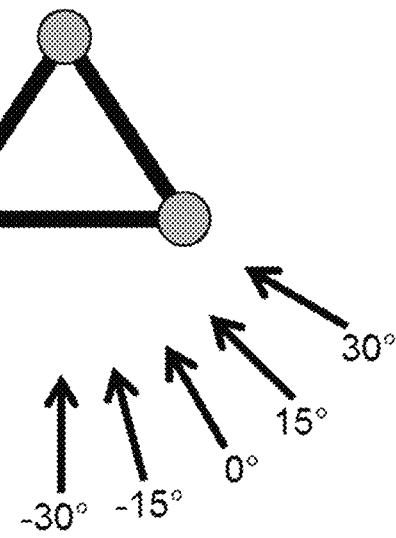
Figure 7a  Figure 7b

STABILIZATION SYSTEM, IN PARTICULAR FOR A FLOATING SUPPORT, COMPRISING AT LEAST THREE INTERCONNECTED LIQUID RESERVES

CROSS-REFERENCE TO RELATED APPLICATIONS

This application is a U.S. national phase application filed under 35 U.S.C. § 371 of International Application No. PCT/EP2017/052294, filed Feb. 2, 2017, designating the United States, which claims priority from French Patent Application No. 16/51.746, filed Mar. 2, 2016, which are hereby incorporated herein by reference in their entirety.

FIELD OF THE INVENTION

The present invention relates to the field of offshore floating support structures, in particular for offshore wind turbines, the field of offshore bottom-fixed support structures, in particular for offshore bottom-fixed wind turbines, and the field of civil engineering, in particular for skyscrapers or bridges.

In the case of offshore wind turbines, the floating support structure supports, in the emerged part, the wind turbine made up of the blades, the rotor, the nacelle and the tower fastened onto the floating support. These floating supports can be anchored to the seabed by taut, semi-taut or catenary anchor lines. The purpose of the floating support is to provide wind turbine buoyancy and stability so as to take up the stresses exerted thereon while limiting motion of the assembly.

BACKGROUND OF THE INVENTION

Various floating support structures intended for installing offshore multi-megawatt wind turbines are currently under development in many countries. Depending on the depth of the site considered, several design options are possible. Despite their great diversity, several floating support families emerge, among which:
- SPAR type floaters, characterized by a slender geometric shape and comprising significant ballast so as to lower the center of gravity of the whole structure to the maximum and thus to provide stability,
- barge type floaters are very wide shallow drafted support structures. Their stability is provided by their wide waterplane area. However, this type of support structure is very sensitive to wave motion,
- TLP (Tension Leg Platform) type support structures that have the specific feature of being moored to the seabed by taut cables providing structure stability, and
- semi-submersible type floaters are support structures consisting of at least three floaters connected by arms providing stiffness. These support structures generally have a low displacement and a great waterplane area inertia, thus providing sufficient righting moment for the stability thereof. Furthermore, this type of floater is less sensitive to wave motion than barges.

Floating support structures can also be used in other fields than offshore wind turbine installation, for example for hydrocarbon production means, wave energy conversion systems (for converting wave energy to mechanical or electrical energy), etc.

In order to enable damping of the motion caused by the waves, various damping solutions have been considered for these floaters.

According to a first solution, damping can be achieved using a ballast system with a "U tube" comprising a liquid that can move between the two vertical branches of the U. This solution is notably described in the following document:
  C. Coudurier, O. Lepreux and N. Petit, Passive and semi-active control of an offshore floating wind turbine using a tuned liquid column damper, in Proc. of 10th IFAC Conference on Manoeuvring and Control of Marine Craft, MCMC, 2015.

However, this solution only allows to damp the motion caused by the waves in a single direction. Indeed, for waves whose direction is not parallel to the "U tube", the motion is not damped. Now, at sea, the direction of the wave motion is variable with time, therefore the motion is not constantly parallel to the "U tube".

Besides, the stability problem also arises in other fields, for example for bottom-fixed structures (notably bottom-fixed wind turbines) that are subjected to stresses caused by the wave motion, as well as civil engineering structures (buildings, bridges) that may undergo stresses caused by the wind or by an earthquake.

The present invention thus relates to a stabilization system for a system subjected to external stresses, the stabilization system comprising at least three liquid reserves and at least three connecting tubes. The liquid reserves are spatially distributed (not located in one plane). Furthermore, the connecting tubes provide circulation of the liquid between all the liquid reserves. The liquid can thus flow in all directions in order to damp excitations, whatever the direction of the wave motion.

SUMMARY OF THE INVENTION

The invention relates to a stabilization system, in particular for a floating support structure, comprising at least three liquid reserves and at least three connecting tubes, said liquid reserves being so distributed that, when viewed from above, the centres of said liquid reserves lie on at least two distinct lines, and said connecting tubes connecting said liquid reserves for circulation of said liquid between said liquid reserves. Said connecting tubes connect all of said liquid reserves to one another.

According to an embodiment, said connecting tubes comprise means for restricting passage of said liquid.

Advantageously, said connecting tubes form a star or a polygon, preferably a regular polygon, the vertices of said star or of said polygon being formed by said liquid reserves, and the edges of said star or of said polygon being formed by said connecting tubes.

According to a variant embodiment, said stabilization system comprises a liquid reserve in the centre of said star or of said polygon.

According to an implementation, said reserves of said liquid comprise a gas in the upper parts thereof.

Advantageously, said stabilization system comprises at least one line allowing passage of said gas and connecting at least two liquid reserves.

Preferably, said gas passage lines are parallel to said connecting tubes.

According to a design, at least one gas passage line comprises gas passage restriction means.

Advantageously, at least one liquid reserve comprises a connection with a gas from the outside medium.

According to an embodiment, said liquid reserves have a substantially cylindrical shape.

According to a characteristic, said stabilization system comprises between three and eight liquid reserves.

According to a design, said connecting tubes are arranged at the lower part of said liquid reserves.

According to an implementation, said connecting tubes are substantially horizontal.

Furthermore, the invention relates to a floating support structure comprising at least one floater and a stabilization system according to one of the above characteristics.

According to an embodiment, said floating support structure comprises at least three floaters, each floater comprising a liquid reserve of said stabilization system.

Furthermore, the invention relates to an offshore energy production system comprising a wind turbine and a floating support structure according to one of the above features.

BRIEF DESCRIPTION OF THE FIGURES

Other features and advantages of the system according to the invention will be clear from reading the description hereafter of embodiments given by way of non-limitative example, with reference to the accompanying figures wherein:

FIGS. 4a to 4d illustrate variants of the second embodiment, FIGS. 5a to 5f illustrate various embodiments of the stabilization system according to the invention, FIG. 6 is a curve showing the displacement amplitude of a floater for a system according to the prior art and for a floater according to the invention, for various incidence angles of the wave motion, and FIGS. 7a and 7b illustrate the wave motion orientation for the example of FIG. 6.

DETAILED DESCRIPTION OF THE INVENTION

Figure 1:
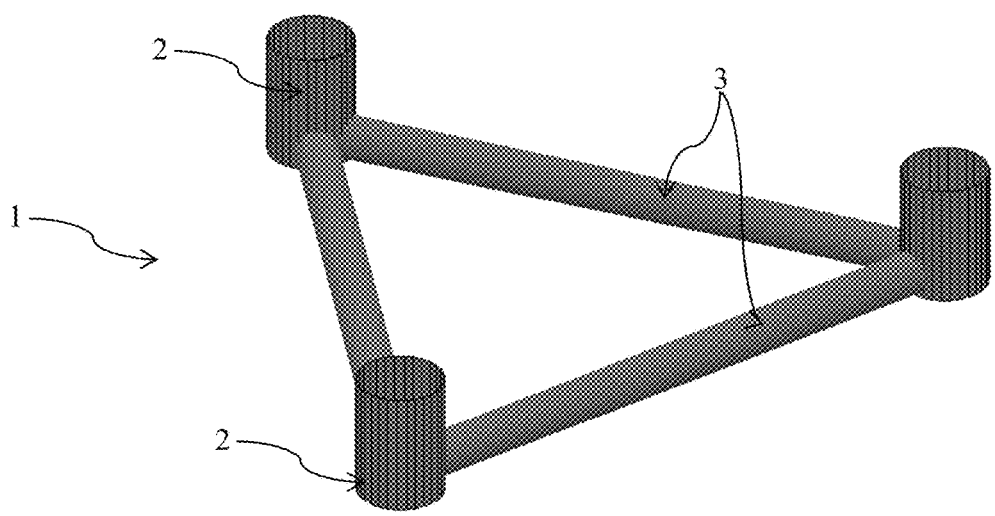
FIG. 1 illustrates a stabilization system according to a first embodiment of the invention.

The present invention relates to a stabilization system for a system likely to be subjected to external stresses. The stabilization system comprises at least three liquid reserves and at least three connecting tubes. The liquid reserves are distributed in a three-dimensional manner (spatially), i.e. when viewed from above, the centres of the liquid reserves lie on at least two distinct lines. Thus, the liquid reserves are distributed in at least two distinct planes. In other words, the liquid reserves do not lie in a single plane, which would correspond, in top view, to an alignment of the centres of the liquid reserves along a single line. This three-dimensional distribution allows the motions of the floating support to be damped in all the wave motion directions. The connecting tubes connect the liquid reserves, thus enabling free circulation of the liquid between the liquid reserves. According to the invention, the connecting tubes connect all the liquid reserves to one another. In other words, the liquid can freely flow, in a dynamic manner (i.e. without being controlled and without external energy supply), from one reserve to any other reserve of the stabilization system. This specific feature allows multidirectional damping to be optimized by means of a dynamic system allowing dynamic stresses to be damped. Furthermore, this feature also enables cost reduction through the use of a single damping system within a floating system, limited space requirement for the liquid reserves and easy adjustment to the floating support geometry (which is not necessarily possible with conventional U tubes). The connecting tubes can connect adjacent liquid reserves and/or they can connect a liquid reserve to a central liquid reserve and/or they can connect a liquid reserve to another connecting tube.

The system that may be subjected to stresses can be a floating support undergoing stresses caused by the wave motion. The system can also be a bottom-fixed structure subjected to stresses caused by the wave motion. Alternatively, this system can be a civil engineering structure: a building, a bridge, etc., subjected to stresses caused by the wind or an earthquake. In the description, only the case of a floating support structure is mentioned, but the different stabilization system variants described are suited for any type of system undergoing external stresses.

Advantageously, the liquid used is water, sea water for example. However, the liquid can be of any type, in particular a liquid that pollutes little or not the water of the ambient medium in case of leakage.

The connecting tubes can be advantageously located in the lower part (at the base) of the liquid reserves, so as to promote displacement of the liquid between the liquid reserves.

Furthermore, the connecting tubes can be substantially horizontal, thus limiting displacement of the liquid through gravity.

In the rest of the description below and in the claims, the terms waves, wave forces and wave motion are considered to be equivalent.

According to an embodiment of the invention, the connecting tubes can form a star or a polygon. In this case, liquid reserves form the vertices of the star or of the polygon, and the connecting tubes form the edges of the star or of the polygon. Selecting a polygon or a star is notably done in order to adapt to the architecture of the floating support structure. Typically, for a semi-submersible type floating support, one can ensure that the reserves are located at the floaters of the semi-submersible structure and that the connecting tubes are supported by the arms connecting the floaters. Since these arms can come in form of a star or of a polygon, the stabilization system can be adapted accordingly.

The "star shape" design allows shorter connecting tubes to be used. The "polygon shape" design allows easier design by avoiding connections between connecting tubes.

For example, the star can have from three to six branches. Besides, the star can have a liquid reserve in the centre thereof. When the connecting tubes form a polygon, the polygon is preferably a regular polygon, thus allowing balanced distribution of the liquid promoting three-dimensional damping of the floating support. For example, the stabilization system can comprise three liquid reserves connected by connecting tubes forming a triangle, preferably an equilateral triangle. According to another example, the stabilization system can comprise four reserves connected by four connecting tubes forming a quadrilateral, preferably a rhombus, and more preferably a square. The polygon can also be a pentagon, a hexagon, an octagon (with eight liquid reserves), etc.

According to an implementation of the invention, at least one connecting tube can be made of steel, composite, plastic, concrete or any similar material.

According to an embodiment of the invention, at least one connecting tube and preferably all the connecting tubes comprise liquid passage restriction means. The liquid passage restriction means allow to slow down the free stream flowing therethrough, so as to optimize the damping provided by the stabilizing system. These liquid passage restriction means can be passive or active. Active restriction means allow the damping performances to be improved. The purpose of active restriction means is not to cause displacement of the liquid; on the contrary, the sole purpose thereof is to hinder/partly limit free circulation of the liquid. The restriction means can consist for example of a local tube diameter reduction, a valve, pumps or compressors, etc. Adjustment of this restriction allows to adjust certain characteristics of the damping system.

The liquid reserves can have various shapes. Thus, they can be suited to different floating support shapes. According to a preferred design of the invention, the liquid reserves have a substantially cylindrical shape. The liquid reserves can then be referred to as columns.

According to an implementation of the invention, at least one liquid reserve can be made of steel, composite, plastic, concrete or any similar material.

According to an implementation of the invention, the lower part of the liquid reserves comprises the liquid and the upper part comprises a gas, notably air. According to a first design, the liquid reserves can freely exchange gas with the outside medium.

For this implementation (with gas in the upper part), the stabilization system can comprise gas passage lines connecting the liquid reserves. The liquid reserves can then be isolated from the outside air, so that an overpressure in a liquid reserve causes a gas stream to flow towards a liquid reserve with a lower pressure through a gas passage line. Advantageously, the gas passage lines are located in the upper part of the liquid reserves. The gas passage lines can be parallel to the connecting tubes. The parallel configuration allows to limit the size of the stabilization system. Alternatively, the gas passage lines can connect the liquid reserves differently from the connecting tubes. For example, when the connecting tubes form a star, the gas passage lines can form a polygon, and conversely, when the connecting tubes form a polygon, the gas passage lines can form a star.

According to a characteristic, the gas passage lines can comprise gas passage restriction means. The gas passage restriction means allow to limit the flow of gas from one liquid reserve to another. These gas passage restriction means can be passive or active. The purpose of active restriction means is not to cause displacement of the gas; on the contrary, the sole purpose thereof is to hinder/partly limit free circulation of the gas. Active restriction means allow the damping performances to be improved. The gas passage restriction means can consist for example of a local tube diameter reduction, a valve, pumps or compressors. Adjustment of this restriction allows to adjust certain characteristics related to the stabilization system damping.

Furthermore, alternatively or additionally to the gas passage lines, at least one liquid reserve can comprise a connection with the outside medium, allowing passage of air from the outside medium to the upper part of the liquid reserve and vice versa. Thus, an overpressure in a liquid reserve generates a gas flow towards the outside. This connection can be a restriction. Adjustment of this overpressure allows to adjust certain characteristics related to the stabilization system damping.

The dimensions of the connecting tubes and of the liquid reserves depend on the dimension of the floating support. One may want to arrange the water reserves as far as possible in the floating support, and the connecting tubes are adapted accordingly. For example, for a 36-m diameter circular barge, in a three-angled polygon configuration, connecting tubes approximately 30 m in length, 1.5 m in diameter, reserves 5 to 10 m in height and 3 m in diameter can be used. Typically, a total mass of liquid (contained in the liquid reserves and the connecting tubes) of the order of 5% to 15% of the mass of the floating support can be used. The concept however works at all scales.

According to an embodiment, the stabilization system comprises an equal number of liquid reserves and of connecting tubes. Alternatively, the difference between the number of liquid reserves and the number of connecting tubes can be equal to one. This equality or near equality allows to ensure that all the liquid reserves are connected to one another by connecting tubes. However, the stabilization system with a larger number of connecting tubes can allow to simultaneously damp several components of the wave motion (typically a rotation and a translation) with a single stabilization system, by increasing the number of eigenfrequencies of the stabilization system.

FIG. 1 schematically shows, by way of non limitative example, a stabilization system according to a first embodiment of the invention. Stabilization system 1 is made up of three liquid reserves 2 and three connecting tubes 3. The centres of liquid reserves 2 lie on two distinct lines, in other words: liquid reserves 2 are not arranged in a single plane, they are spatially distributed. Liquid reserves 2 have a substantially cylindrical shape. Each connecting tube 3 connects two liquid reserves 2. Thus, connecting tubes 3 form a triangle. In the case illustrated, it is an equilateral triangle. Connecting tubes 3 are arranged in the lower part of liquid reserves 2. This configuration is suited to a trifloater type floating support, where each floater comprises a liquid reserve 2. This variant embodiment is also suited for a floating support with a single floater, this single floater comprising the entire stabilization system.

FIGS. 2a to 2d schematically show in top view, by way of non-limitative example, four variants of the first embodiment, i.e. with three liquid reserves connected in triangle.

Figures 2A, 2B:
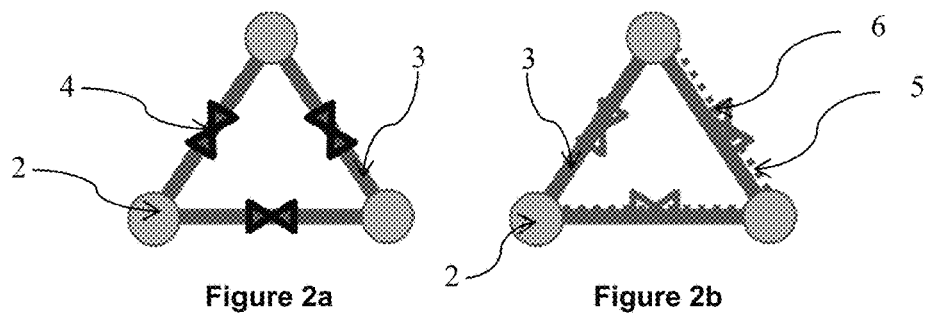
FIGS. 2a to 2d illustrate variants of the first embodiment.

The stabilization system according to the variant embodiment of FIG. 2a comprises, in addition to the elements illustrated in FIG. 1, liquid passage restriction means 4. Liquid passage restriction means 4 are provided on each connecting tube 3. They allow to reduce the flow of liquid passing through connecting tubes 3.

The stabilization system according to the variant embodiment of FIG. 2b comprises, in addition to the elements illustrated in FIG. 1, gas passage lines 5 (in dotted line) and gas passage restriction means 6. Gas passage lines 5 connect the upper part of liquid reserves 2 for gas passage from one liquid reserve to another. For this variant, gas passage lines 5 are parallel to connecting tubes 3, thus forming a triangle. Besides, each gas passage line 5 comprises gas passage restriction means 6. They allow to limit the flow of gas between liquid reserves 2. However, these gas passage restriction means 6 are optional.

Figures 2C, 2D:
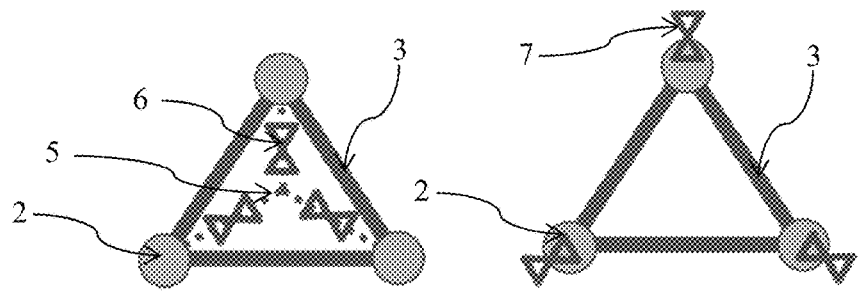

The stabilization system according to the variant embodiment of FIG. 2c comprises, in addition to the elements illustrated in FIG. 1, gas passage lines 5 (in dotted line) and gas passage restriction means 6. Gas passage lines 5 connect the upper part of liquid reserves 2 for gas passage from one liquid reserve to another. For this variant, gas passage lines 5 are not parallel to connecting tubes 3, and they form a star by meeting in the centre of the triangle formed by connecting tubes 3. Besides, each gas passage line 5 comprises gas passage restriction means 6. They allow to limit the flow of gas between liquid reserves 2. However, these gas passage restriction means 6 are optional.

The stabilization system according to the variant embodiment of FIG. 2*d* comprises, in addition to the elements illustrated in FIG. 1, connections 7 with the outside medium. Connections 7, in form of restrictions, allow passage of the gas from the outside medium to the upper part of liquid reserves 2 and vice versa. This variant can further comprise gas passage lines (not shown).

These variant embodiments can be combined with one another; notably, the stabilization systems of the variant embodiments of FIGS. 2*b* to 2*d* can comprise liquid passage restriction means as illustrated in FIG. 2*a*.

Figure 3:
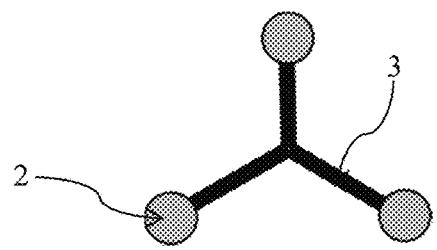
FIG. 3 illustrates a stabilization system according to a second embodiment of the invention.

FIG. 3 schematically shows in top view, by way of non-limitative example, a stabilization system according to a second embodiment of the invention. Stabilization system 1 is made up of three liquid reserves 2 and three connecting tubes 3. The centres of liquid reserves 2 lie on two distinct lines, in other words: liquid reserves 2 are not arranged in a single plane, they are spatially distributed. Liquid reserves 2 have a substantially cylindrical shape. Each connecting tube 3 connects one liquid reserve 2 and two other connecting tubes 3. Thus, connecting tubes 3 form a star with three branches. Connecting tubes 3 are arranged in the lower part of the liquid reserves. This configuration is suited to a tri-floater type floating support, where each floater comprises a liquid reserve 2. This variant embodiment is also suited for a floating support with a single floater, this single floater comprising the entire stabilization system.

FIGS. 4*a* to 4*d* schematically show in top view, by way of non-limitative example, four variants of the second embodiment, i.e. with three liquid reserves connected in a star configuration.

The stabilization system according to the variant embodiment of FIG. 4*a* comprises, in addition to the elements illustrated in FIG. 3, liquid passage restriction means 4. Liquid passage restriction means 4 are arranged on each connecting tube 3. They allow to reduce the flow of liquid passing through connecting tubes 3.

The stabilization system according to the variant embodiment of FIG. 4*b* comprises, in addition to the elements illustrated in FIG. 3, liquid passage restriction means, gas passage lines 5 (in dotted line), gas passage restriction means 6 and connections 7 with the outside medium. Liquid passage restriction means 4 are provided on each connecting tube 3. They allow to reduce the flow of liquid passing through connecting tubes 3. Gas passage lines 5 connect the upper part of liquid reserves 2 for gas passage from one liquid reserve 2 to another. For this variant, gas passage lines 5 are not parallel to connecting tubes 3, thus forming a triangle. Besides, each gas passage line 5 comprises gas passage restriction means 6. They allow to limit the flow of gas between liquid reserves 2. However, these gas passage restriction means 6 are optional. Furthermore, connections 7, in form of restrictions, allow passage of the gas from the outside medium to the upper part of liquid reserves 2 and vice versa.

The stabilization system according to the variant embodiment of FIG. 4*c* comprises, in addition to the elements illustrated in FIG. 3, gas passage lines 5 (in dotted line) and gas passage restriction means 6. Gas passage lines 5 connect the upper part of liquid reserves 2 for gas passage from one liquid reserve to another. For this variant, gas passage lines 5 are parallel to connecting tubes 3, thus forming a star. Besides, each gas passage line 5 comprises gas passage restriction means 6. They allow to limit the flow of gas between liquid reserves 2. However, these gas passage restriction means 6 are optional.

The stabilization system according to the variant embodiment of FIG. 4*d* comprises, in addition to the elements illustrated in FIG. 3, connections 7 with the outside medium. Connections 7, in form of restrictions, allow passage of the gas from the outside medium to the upper part of liquid reserves 2 and vice versa. This variant can further comprise gas passage lines (not shown).

These variant embodiments can be combined with one another; notably, the stabilization systems of the variant embodiments of FIGS. 4*c* and 4*d* can comprise liquid passage restriction means. Furthermore, each variant embodiment of FIGS. 4*a* to 4*d* can comprise a liquid reserve in the centre of the star.

FIGS. 5*a* to 5*f* illustrate in top view, by way of non-limitative example, other embodiments of the stabilization system according to the invention. In these figures, only the main elements are shown. However, these embodiments are compatible with the use of gas passage lines, liquid passage restriction means, gas passage restriction means, connections with the outside medium, etc.

The stabilization system according to the embodiment of FIG. 5*a* comprises six liquid reserves 2 and six connecting tubes 3. The centres of the liquid reserves lie on three distinct lines, in other words: liquid reserves 2 are not arranged in a single plane, they are spatially distributed. Liquid reserves 2 have a substantially cylindrical shape. Each connecting tube 3 connects two liquid reserves 2. Thus, connecting tubes 3 form a hexagon. In the case illustrated, it is a regular hexagon. Connecting tubes 3 are located in the lower part of the liquid reserves. This arrangement is suited to a hexa-floater type floating support where each floater comprises a liquid reserve 2. This variant embodiment is also suited for a floating support comprising a single floater, this single floater comprising the entire stabilization system.

FIG. 5*b* schematically shows in top view, by way of non-limitative example, a stabilization system according to another embodiment of the invention. Stabilization system 1 is made up of six liquid reserves 2 and six connecting tubes 3. The centres of liquid reserves 2 lie on three distinct lines, in other words: liquid reserves 2 are not arranged in a single plane, they are spatially distributed. Liquid reserves 2 have a substantially cylindrical shape. Each connecting tube 3 connects a liquid reserve 2 and the other connecting tubes 3. Thus, connecting tubes 3 form a star with six branches. Connecting tubes 3 are arranged in the lower part of the liquid reserves. This configuration is suited for a hexa-floater type floating support where each floater comprises a liquid reserve 2. This variant embodiment is also suited to a floating support comprising a single floater, this single floater comprising the entire stabilization system. This embodiment can optionally comprise a liquid reserve in the centre of the star (not shown).

FIG. 5*c* schematically shows in top view, by way of non-limitative example, a stabilization system according to another embodiment of the invention. Stabilization system 1 is made up of four liquid reserves 2 and three connecting tubes 3. The centres of liquid reserves 2 lie on two distinct lines, in other words: liquid reserves 2 are not arranged in a single plane, they are spatially distributed. Liquid reserves 2 have a substantially cylindrical shape. Each connecting tube 3 connects a liquid reserve 2 to another liquid reserve. Thus, connecting tubes 3 form a star with three branches and comprise a central liquid reserve (in the centre of the star). Connecting tubes 3 are arranged in the lower part of the liquid reserves. This configuration is suited to a tri-floater type floating support, where each floater comprises a liquid reserve 2. This variant embodiment is also suited for a floating support with a single floater, this single floater comprising the entire stabilization system.

The stabilization system according to the embodiment of FIG. 5d comprises four liquid reserves 2 and four connecting tubes 3. Liquid reserves 2 are not arranged in a single plane, they are spatially distributed. The centres of liquid reserves 2 lie on two distinct lines, in other words: liquid reserves 2 have a substantially cylindrical shape. Each connecting tube 3 connects two liquid reserves 2. Thus, connecting tubes 3 form a quadrilateral. In the case illustrated, it is a square. Connecting tubes 3 are arranged in the lower part of the liquid reserves. This configuration is suited to a quadri-floater type floating support, where each floater comprises a liquid reserve 2. This variant embodiment is also suited for a floating support with a single floater, this single floater comprising the entire stabilization system.

The stabilization system according to the embodiment of FIG. 5e comprises five liquid reserves 2 and five connecting tubes 3. The centres of liquid reserves 2 lie on three distinct lines, in other words: liquid reserves 2 are not arranged in a single plane, they are spatially distributed. Liquid reserves 2 have a substantially cylindrical shape. Each connecting tube 3 connects two liquid reserves 2. Thus, connecting tubes 3 form a pentagon. In the case illustrated, it is a regular pentagon. Connecting tubes 3 are arranged in the lower part of the liquid reserves. This configuration is suited for a penta-floater type floating support where each floater comprises a liquid reserve 2. This variant embodiment is also suited to a floating support comprising a single floater, this single floater comprising the entire stabilization system.

The stabilization system according to the embodiment of FIG. 5f comprises four liquid reserves 2 and six connecting tubes 3. The centres of liquid reserves 2 lie on two distinct lines, in other words: liquid reserves 2 are not arranged in a single plane, they are spatially distributed. Liquid reserves 2 have a substantially cylindrical shape. Each connecting tube 3 connects two liquid reserves 2. For this embodiment, connecting tubes 3 form a star and a triangle, in particular an equilateral triangle, with a liquid reserve 2 arranged in the centre of the triangle. Connecting tubes 3 are arranged in the lower part of the liquid reserves. This configuration is suited for a quadri-floater type floating support where each floater comprises a liquid reserve 2. This variant embodiment is also suited to a floating support comprising a single floater, this single floater comprising the entire stabilization system. This design allows to damp two components of the wave motion simultaneously (typically a rotation and a translation) with a single damping system (this is possible because the number of eigenfrequencies is increased).

Furthermore, the present invention relates to a floating support. The floating support comprises a stabilization system according to any one of the variant combinations described above. The stabilization system allows to damp the multidirectional motion of the waves for the floating support.

The floating support can have a single floater of substantially cylindrical shape, as described in patent application FR-2,998,338 for example. In this case, the stabilization system can be contained in the single floater.

Alternatively, the floating support can have a plurality of floaters connected to one another. It can notably be of tri-floater type, as described in patent application FR-2,990,005 (US-2015/0,071,779). This design with several floaters generally has a low displacement and a great waterplane area inertia, thus providing sufficient righting moment for the stability thereof. Furthermore, this type of floater is less sensitive to wave motion than barges. In case of a plurality of floaters, each floater can comprise a liquid reserve of the stabilization system, the connecting tubes of the stabilization system then connect the various floaters with one another and they can be supported by the structure of the multi-floater floating support.

These floating supports can be anchored to the seabed by taut, semi-taut or catenary anchor lines.

The present invention also relates to a wind turbine installation on a stretch of water (sea for example). The installation comprises a vertical-axis or horizontal-axis wind turbine and a floating support according to any one of the variant combinations described above. The purpose of the floating support is to provide wind turbine buoyancy and stability so as to take up the stresses exerted thereon while limiting motion of the assembly. The floating support according to the invention is particularly well suited for installing an offshore wind turbine (at sea) in order to provide wave motion damping and wind turbine stability.

The floating support according to the invention can also be used in other fields than offshore wind turbine installation (at sea), for example for hydrocarbon production means, wave energy conversion systems (for converting the energy of waves to mechanical or electrical energy), as well as civil engineering, for skyscrapers or bridges for example.

Example

To evaluate the performances of a floating support (floater) provided with a stabilization system according to the invention, we can describe on the one hand the interactions between the latter and the floater and, on the other hand, the interactions between the floater and the wave motion. A Lagrangian approach is used to obtain the equations of motion, whose general form is given by:

$$\frac{d}{dt}\frac{\partial L}{\partial q'_k} - \frac{\partial L}{\partial q_k} = Q_k$$

where L is the Lagrangian of the system consisting of the floater and the stabilization system, $q_k$ the parameters of the system and $Q_k$ the generalized forces.

With this example, we show the multidirectional character of the stabilization system according to the invention. We therefore evaluate the response of a floater provided with a stabilization system according to the invention as illustrated in FIG. 1, for various incidence angles of the wave motion. A local reference frame is associated with each incidence angle, as defined in FIG. 7a. Whatever the incidence angle, the movements of the floater are evaluated in the local reference frame of the incident wave motion (therefore of the excitation), notably in terms of angular motion amplitude in the direction perpendicular to the incident wave (along $x_F$).

The results are given in FIG. 6 using the MIT barge as the floater (as described in the document: J. M. Jonkman, Dynamics modeling and loads analysis of an offshore floating wind turbine, PhD Thesis NREL/TP-500-41958, National Renewable Energy Laboratory, November 2007). FIG. 6 comprises curves of ratio A (°/m) of the angular amplitude to the wave height as a function of the wave period Th (s). This floater being circular, by symmetry, its response without a damping device, i.e. according to the prior art, is identical whatever the incidence angle. This response is given by curve REF. To evaluate the response sensitivity of the floater provided with the stabilization system according to the invention to the wave incidence angle, this angle is varied by 15° intervals between −30° and +30° (see FIG. 7b). The "equilateral triangle-shaped" support according to the invention being itself invariant by 120° rotation and symmetrical, this 60° scan is equivalent to a 360° scan of the incidence angle. The curves (one for each wave incidence angle) obtained for the system according to the invention are denoted by INV. These curves nearly merge. In relation to reference REF according to the prior art, using the stabilization system according to the invention INV allows a very significant decrease (about 50%) in the motion amplitude to be obtained over a wide range of excitation periods, as it is the case for a barge provided with a simple "U tube" arranged in the incidence plane of the waves. Furthermore, by superposing the curves, a very low sensitivity to the incidence angle can be seen. We can therefore say that the stabilization system according to the invention has a multidirectional character for damping. A contrario, a system with a simple "U tube" allows no damping for a wave motion whose incidence angle is perpendicular to the axis of the "U tube".

The invention claimed is:

1. A stabilization system for a floating support structure, the system comprising: at least three liquid reserves and at least three connecting tubes, the liquid reserves being so distributed that, when viewed from above, centers of the liquid reserves lie on at least two distinct lines, and the connecting tubes connecting the liquid reserves for wave-induced circulation of a liquid between the liquid reserves in a dynamic manner, wherein the connecting tubes connect all of the liquid reserves to one another.

2. A system as claimed in claim 1, wherein the connecting tubes comprise means for restricting passage of the liquid, the means for restricting passage of the liquid attenuating the wave-induced circulation of the liquid.

3. A system as claimed in claim 1, wherein the connecting tubes form a star or a polygon, vertices of the star or of the polygon being formed by the liquid reserves, and edges of the star or of the polygon being formed by the connecting tubes.

4. A system as claimed in claim 3, wherein the stabilization system further comprises another liquid reserve in a center of the star or of the polygon.

5. A system as claimed in claim 3, wherein the connecting tubes form a regular polygon.

6. A system as claimed in claim 1, wherein upper parts of the liquid reserves comprise a gas.

7. A system as claimed in claim 6, wherein the stabilization system comprises at least one gas passage line allowing passage of the gas and connecting at least two liquid reserves of the liquid reserves.

8. A system as claimed in claim 7, wherein the at least one gas passage line is parallel to a connecting tube of the connecting tubes.

9. A system as claimed in claim 7, wherein the at least one gas passage line comprises gas passage restriction means.

10. A system as claimed in claim 7, wherein the at least one gas passage line comprises a restriction attenuating passage of the gas.

11. A system as claimed in claim 6, wherein at least one liquid reserve of the liquid reserves comprises a connection with a gas from an outside medium.

12. A system as claimed in claim 1, wherein the liquid reserves have a substantially cylindrical shape.

13. A system as claimed in claim 1, wherein the stabilization system comprises between three and eight liquid reserves.

14. A system as claimed in claim 1, wherein the connecting tubes are arranged at a lower part of the liquid reserves.

15. A system as claimed in claim 1, wherein the connecting tubes are substantially horizontal.

16. A floating support structure comprising at least one floater and the stabilization system as claimed in claim 1.

17. A floating support structure as claimed in claim 16, wherein the floating support structure comprises at least three floaters, each floater of the at least three floaters comprising a liquid reserve of the liquid reserves of the stabilization system.

18. An offshore energy production system comprising a wind turbine and the floating support structure as claimed in claim 16.

19. A system as claimed in claim 1, wherein the connecting tubes comprise a restriction attenuating the wave-induced circulation of the liquid.

* * * * *